Patented Jan. 12, 1937

2,067,318

UNITED STATES PATENT OFFICE

2,067,318

MANUFACTURE OF AQUEOUS SOLUTIONS SUITABLE FOR INJECTION FROM SUBSTITUTED BARBITURIC ACIDS

Heinrich Gruber, Schoneberg, near Berlin, Germany

No Drawing. Application February 4, 1933, Serial No. 655,263. In Germany September 23, 1932

18 Claims. (Cl. 167—52)

This invention relates to preparing aqueous solutions from barbituric acids and it comprises improved methods of making such solutions wherein the barbituric acid is admixed with a water soluble aliphatic polyhydric alcohol, such as glycerine, glycol, etc., and the mixture so obtained is added to an amount of dilute aqueous alkali lye solution sufficient to dissolve the mixture, said aqueous solution containing a molar amount of alkali not exceeding that equivalent to the barbituric acid employed, and the aqueous mixture is agitated until the barbituric acid is dissolved and a clear solution is obtained; and it also comprises the aqueous solutions so obtained, said solutions being suitable for injection and comprising the barbituric acid dissolved in an aqueous alcoholic solution free of excess alkali and containing an aliphatic polyhydric alcohol; all as more fully hereinafter set forth and as claimed.

It is well known that barbituric acids are substantially insoluble in water and in most ordinary solvents and that special means are necessary to obtain solutions of those acids. Generally, the barbituric acids are converted into other derivatives which are soluble. It is also well known that the barbituric acids will dissolve in aqueous solutions of alkali lye.

In preparing aqueous solutions from the barbituric acids, it is necessary to employ an amount of alkali lye in excess of the molar equivalent to dissolve all the acid. The solutions so obtained naturally contain an appreciable amount of free alkali. This is undesirable in solutions for injection since solutions having so high a hydrogen exponent give disagreeable by-effects when engaged. Moreover, the stableness of such solutions is seriously impaired by the presence of alkali.

In a copending application Serial No. 615,951, I have described and claimed improved methods of making stable aqueous solutions of alkali metal salts of barbituric acids, wherein water-soluble pyrazolones or other non-albuminous, organic nitrogen-containing, hydrotropic substances capable of preventing the hydrolysis of the alkali metal salts is incorporated with such solutions to stabilize them. Several methods for producing aqueous solutions of the alkali metal salt containing the acid and alkali combined in substantially equi-molecular proportions are described. In one method the barbituric acid is added to an aqueous solution containing insufficient alkali lye to dissolve all the acid, the excess of insoluble acid being filtered off and the stabilizer then added to the nitrate. However, it is not easy to stabilize those solutions at the exact point necessary to insure the complete absence of free alkali.

In the usual practice of the invention of my said copending application, the alkali metal salt is added to and dissolved in an aqueous solution of the stabilizing agent. However, in such process the alkali metal salts must first be produced from the free acids by rather expensive methods.

In the present invention it is not necessary to employ a preformed alkali metal salt. Instead, the barbituric acid may be directly used as the starting material for preparing aqueous solutions suitable for injection. Nor in doing so is it necessary to employ an excess of the acid and remove the undissolved acid by filtration.

I have now found that the barbituric acid can be dissolved in aqueous solutions of alkali lye containing a molar amount of such lye not exceeding that equivalent to the acid, provided the acid is first intimately admixed with aliphatic polyhydric alcohols prior to adding that mixture to the aqueous solution. In this way, stable aqueous solutions are obtained which are suitable for injection and which contain no excess or free alkali. That is, by so employing the aliphatic polyhydric alcohols the barbituric acid may be completely brought into solution with smaller amounts of alkali lye. The solutions thus obtained while having a natural stability which is desirable, due to the presence of the polyhydric alcohol in solution, may be further stabilized by the addition of the hydrotropic substances or stabilizing agents set forth in my said copending application.

In the usual practice of the present invention the barbituric acid designed for injection purposes is mixed with about the equal amount of a water-soluble polyvalent alcohol, for instance glycerine, whereupon diluted alkali lye is added in an amount equivalent to that of the barbituric acid and the mixture is shaken until the barbituric acid is dissolved. In this way the entire amount of barbituric acid passes into solution. Finally a stabilizing agent, for instance a water-soluble pyrazolone or the like, is added, as described in the above named patent.

The present invention, which is particularly adapted for barbituric acids of slightly acid character and which also is suited for a series of CC-disubstituted - N - monosubstituted barbituric acids, forms together with the invention set forth in the said patent an exceedingly simple method of producing stable, injectable solutions of the alkali metal salts of substituted barbituric acids.

Polyvalent alcohols, such as for instance glycerine, have already been used, alone or in combination with alcohol, in injection solutions of the said kind. In such cases the glycerine does only serve as a solvent for the solid alkali metal salts of the barbituric acids (when no water is present) or for increasing to some degree, the durability of the aqueous solutions of the alkali metal salts. In the present case, however, the glycerine serves for quite another purpose.

Example 1

187 g. of bromallyl-sec. amyl-barbituric acid and 200 g. of glycerine are stirred together, 590 ccm. of n/1 soda lye and 500 ccm. of water are added and the mixture is shaken vigorously for about two hours. To this solution a solution of 200 g. of dimethyl-phenyl-pyrazolone in 200 ccm. of water is added and thereupon still more water is added under shaking until a total amount of exactly 2 litres has been obtained. The resulting homogeneous solution is finally sucked through an ultra-filter and immediately filled into containers under exclusion of air.

Example 2

To an intimate mixture of 45.6 g. of CC-isoamyl-ethyl-barbituric acid and 50 g. of glycol 201.8 ccm. of n/1 soda lye are added and the entire composition is shaken vigorously for some time in a closed container. To the resulting solution an aqueous acetamide solution of 70% strength is added under shaking until a total volume of 500 ccm. has been obtained and this fluid is filtered through a filter adapted to retain bacteria.

Example 3

100 g. of CC-isopropyl-bromallyl-N-bromallyl-barbituric acid and 100 g. of propylenglycol are mixed together, 247 ccm. of n/1 soda lye and 160 ccm. of water are added and the resulting mixture is shaken until the barbituric acid has passed into solution. To this solution a solution of 100 g. of dimethyl-phenyl-pyrazolone in 100 ccm. of water is added and thereupon additional amounts of water are added until a total volume of 1000 ccm. has been obtained, whereupon the homogeneous solution is sucked off through an ultra-filter.

These solutions have the same physical constants as a solution of the same concentration (i. e. 10%), which has been produced from the solid sodium salts.

It is obvious, that various changes and modifications may be made in practicing the invention, in departure from the particular description, without departing from the true spirit of the invention. The term barbituric acid as used in the claims is intended to cover substituted barbituric acids of any kind, for instance C,C-disubstituted or C,C-disubstituted N-mono-substituted barbituric acids.

I claim:—

1. As an improvement in preparing aqueous solutions, suitable for injection, from barbituric acids, the improvement which comprises intimately admixing the barbituric acid with a water-soluble aliphatic polyhydric alcohol, adding to the mixture so obtained an amount of dilute aqueous alkali lye solution, sufficient to dissolve the barbituric acid, said aqueous solution containing a molar amount of alkali not exceeding that equivalent to the barbituric acid employed, and agitating the aqueous mixture until the barbituric acid is dissolved and a clear solution is obtained, the barbituric acid thus becoming dissolved in an aqueous alcoholic solution free of excess alkali and containing an aliphatic polyhydric alcohol.

2. The process of claim 1 wherein the natural stability of said solution is further increased by incorporating therewith a water-soluble, non-albuminous, organic nitrogen-containing, hydrotropic substance capable of stabilizing alkali metal salts of barbituric acids against hydrolysis by aqueous solutions.

3. The process of claim 1 wherein the solution so obtained is further stabilized and diluted with an aqueous solution of a pyrazolone.

4. The process of claim 1 wherein said barbituric acid is a CC-disubstituted-N-mono-substituted barbituric acid.

5. As an improvement in preparing aqueous solutions suitable for injection from substituted barbituric acids, the improvement which comprises intimately admixing a CC-disubstituted-N-mono-substituted barbituric acid with propylene glycol, adding to the mixture so obtained an amount of dilute aqueous soda lye sufficient to dissolve the barbituric acid, said aqueous solution containing a molar amount of soda not exceeding that equivalent to the barbituric acid employed, agitating the aqueous mixture until the barbituric acid is dissolved and a clear solution is obtained and then diluting the solution so obtained with an aqueous solution of dimethyl-phenyl pyrazolone.

6. As a new and improved barbituric acid preparation, a stable aqueous solution suitable for injection, said preparation comprising barbituric acid dissolved in an aqueous alcoholic solution free of excess alkali and containing an aliphatic polyhydric alcohol and a molar amount of alkali lye not exceeding that equivalent to the barbituric acid employed.

7. The improved preparation of claim 6 wherein said aqueous alcoholic solution also contains dissolved therein a non-albuminous, organic nitrogen-containing, hydrotropic substance capable of stabilizing alkali metal salts of barbituric acid against hydrolysis, to further increase the natural stability of said solution.

8. The improved preparation of claim 6 wherein said barbituric acid is a CC-disubstituted-N-mono-substituted barbituric acid.

9. The improved preparation of claim 6 wherein said aqueous alcoholic solution also contains a pyrazolone dissolved therein, to further stabilize said solution.

10. As a new barbituric acid preparation, a stable aqueous solution suitable for injection, said preparation comprising a CC-disubstituted-N-mono-substituted barbituric acid dissolved in an aqueous alcoholic solution free of excess alkali and containing an aliphatic polyhydric alcohol, a molar amount of alkali lye not exceeding that equivalent to the barbituric acid and a water soluble pyrazolone compound.

11. The preparation of claim 10 wherein said barbituric acid is a CC-isopropyl-bromallyl-N-bromallyl-barbituric acid, said aliphatic alcohol is propylene glycol and said pyrazolone compound is dimethyl-phenyl pyrazolone.

12. In the preparation of stable, aqueous solutions suitable for injection from barbituric acids, the improvement which comprises intimately admixing the barbituric acid with a water-soluble aliphatic polyhydric alcohol, prior to dissolving the said acid in a dilute aqueous solution of soda lye, the amount of said polyhydric alcohol being sufficient to produce a clear solution of the said acid when the mixture is dissolved in an aqueous solution containing a molar amount of alkali not exceeding that equivalent to the barbituric acid employed, the subsequent dissolving of said admixture producing a clear stable solution free of excess alkali and suitable for administration by injection.

13. The improved preparation of claim 6 wherein said aliphatic alcohol is glycerine and wherein the said aqueous alcohol solution also contains a pyrazolone dissolved therein to further increase the inherent stability of said solution.

14. The process of claim 1 wherein said polyhydric alcohol is glycerine.

15. The improved preparation of claim 6 wherein said barbituric acid is bromallyl-secondary amyl-barbituric acid, said polyhydric alcohol is glycerine, said alkali is soda lye and wherein said aqueous alcoholic solution also contains dimethylphenyl-pyrazolone dissolved therein.

16. The process of claim 1 wherein said barbituric acid is bromallyl-secondary amyl-barbituric acid.

17. The process of claim 1 wherein said barbituric acid is CC-isoamyl-ethyl-barbituric acid.

18. The process of claim 1 wherein said polyhydric alcohol is glycol.

HEINRICH GRUBER.